April 18, 1967   T. ONGARO ETAL   3,315,158
INSTRUMENT FOR MEASURING THE SPEED OF AN
INTERNAL COMBUSTION ENGINE
Filed Nov. 20, 1962

INVENTORS
THEODORE ONGARO
EUGENE R. LUCKA
BY
ATTORNEY

United States Patent Office 3,315,158
Patented Apr. 18, 1967

3,315,158
INSTRUMENT FOR MEASURING THE SPEED OF AN INTERNAL COMBUSTION ENGINE
Theodore Ongaro and Eugene R. Lucka, Columbus, Ohio, assignors to Ongaro Dynamic Industries, Inc., a corporation of Ohio
Filed Nov. 20, 1962, Ser. No. 238,975
5 Claims. (Cl. 324—70)

This invention relates generally to instruments for the measurement of events in a unit of time and specifically to a new and improved instrument operable to reliably, accurately, and instantaneously measure events occurring in a unit of time.

There are many prior art instruments designed for measuring the cadence, rate of occurrence, repetition, and revolutions per minute of a train of pulses or events in a unit of time having uniform spacing from one another. Generically these general types of instruments are known as tachometers. Examples of the uses of tachometers may be wind velocity, heartbeat of a person, impacts of a rotating wheel, and the throb of an engine. The present invention has particular reference to those tachometers that measures the throb of an engine, i.e., the r.p.m.—although equally as applicable to measuring other events occurring in a unit of time.

The electrical tachometers essentially comprise circuits that (a) count the ignition pulses, such as, by charging and discharging of a capacitor, (b) have a current responsive device such as a gas tube or a transistor whose total current is related to the number of ignition pulses and hence the speed of the engine, and, (c) utilize the ignition pulses as a trigger pulse in a pulse forming circuit. The patent to Faria, Number 3,005,155, is typical of the charging and discharging of a capacitor type of electric tachometer; the patent to Cohen, Number 2,934,703, is typical of the current buildup circuits; and, the patent to Haggai et al., Number 2,927,268, shows a pulse forming circuit responsive to the ignition pulse.

The circuit in the Faria patent, supra, includes a transformer whose primary is in series with the ignition circuit and a secondary in series with a pair of resistors, a condenser, and an ammeter. As the points in the ignition system closes, a voltage is built up in the secondary of the transformer causing current to flow through the circuit that builds up a charge in the capacitor. The capacitor is then discharged by back current flow when the voltage across the secondary drops. The process repeats itself on the next pulse.

The tachometer disclosed in the patent to R. M. Cohen, supra, is another version of the current build up type of circuit. In this circuit, during the period of time when the make and break contact points of the ignition circuit breaker are opened, a voltage wave is developed which is applied to the input electrode of a transistor. These voltage waves or pulses are a function of engine speed and when differentiated and applied to the transistor serve to bias the transistor into conduction. The transistor emitter or collector current is then measured as a function of the frequency of the applied pulses and thus gives an indication of the engine speed.

The patent to Haggai et al., supra, is a pulse forming electrical tachometer. This circuit comprises a feedback amplifier type of oscillator wherein a pair of transistors are biased so that in the absence of a pulse applied to their input terminal no current will flow. With the ignition pulse applied to the transistor this circuit will be triggered on. The voltage at the output of this transistor is applied to the other transistor through a capacitor and a meter circuit. This causes the other transistor to be triggered on to permit current to flow. The increased voltage, as a result of current flow, will tend to maintain the transistors conducting until saturation. After saturation, the capacitor current decays until its magnitude is insufficient to sustain conduction, and both of the transistors are again cut off. A meter in the output will average the pulses applied to it, and a by-pass resistor is varied so that the meter may be calibrated in revolutions per minute.

The accuracy of these prior art tachometers is dependent upon the care in its production and the calibration procedure at the factory. Unfortunately, the degree of accuracy becomes doubtful with usage, and with extended usage, the instrument cannot be considered calibrated and consequently its reliability has diminished. Even in those instances where the tachometer has not lost its calibration after extended usage, its accuracy will not be known and will be questioned. In order to restore the accuracy of the instrument or to eliminate doubt, the instrument must be removed from its operation and returned to the factory for recalibration.

But of even more significance, the tachometers, especially those designed to operate from combustion engine ignition systems, do not have the inherent feature of being able to be calibrated accurately from a standard signal at all of the various frequency positions. For instance, in the above mentioned Haggai patent, a voltage divider resistance is varied to "calibrate" the meter. The most this potentiometer can do is to compensate or correct for errors in the meter. Assuming that a standard signal were available and applied to this circuit and as the meter is corrected to read true r.p.m. at one end, the other end of the scale in all probability (because of nonlinearity) will not read accurately. Consequently, since an eight (8) cylinder engine has four (4) ignition pulses per revolution; a six (6) cylinder engine has three (3) ignition pulses per revolutions; and a four (4) cylinder engine has two (2) ignition pulses per revolution, it is necessary to differently calibrate each tachometer at the factory for its ultimate use.

Finally, the configuration of the prior art tachometers operable from an ignition pulse have not proven to be either linear or reliable, are not instantaneously responsive, nor do they provide a flutter free dial indication. Their construction, in order to overcome these inherent disadvantages, has been very complicated and bulky.

The present invention overcomes the above noted disadvantages by providing a simply constructed tachometer that may be calibrated to accurately respond at all the various frequencies; the highly linear frequency response is coupled with terminal accuracy hereintofore unobtainable with the prior art tachometers; and the reading is instantaneous and completely free from flutter at either the high or low frequency end. Specifically, the new and improved tachometer has as one of its primary features the generation of constant width pulses. The duration of the pulses being directly related to the parameters of the circuit. It is this part of the circuit that is variable which in turn varies the width of the output pulses. Varying the width of the pulses truly calibrates the circuit to permit the meter to read the average current and hence true r.p.m.

In order to assure that a true standard signal is applied to the circuit for calibration, the calibration method disclosed in our co-pending application, Serial Number 221,158, now Patent No. 3,260,101, is employed. In essence the circuit disclosed therein is utilized to accurately check the calibration of a tachometer without requiring that the tachometer be removed from either its operation or other environment and wherein the calibration is extremely simple and instantaneous. An accurate standard signal is obtained by converting a 60-cycle alternating current signal into pulses of many multiples dependent upon the range of measurement of the tachometer.

It is accordingly a principal object of the present invention to provide a new and improved instrument operable to measure events occurring per unit of time.

It is a further object of the present invention to provide a new and improved tachometer that is highly linear with frequency coupled with terminal accuracy.

It is another object of the present invention to provide a tachometer that is extremely simple and relatively inexpensive and yet provide a single accurate reading at all the frequencies of interest.

Another object of the present invention is to provide a tachometer that adapts itself to be calibrated from a standard signal source and which calibration may be made without removing the instrument from its operational environment.

Still another object of the invention is to provide a tachometer utilizing a new and improved principle of operation.

Other objects and features of the invention will become apparent from the following detailed description when taken inconjunction with the drawing in which.

Figure 1:
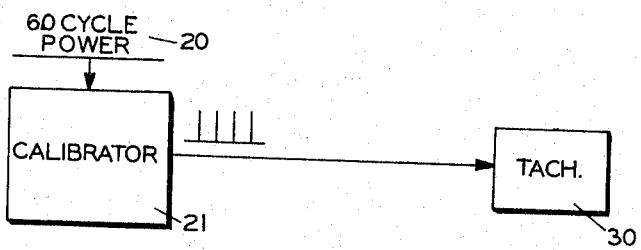
FIG. 1 illustrates a simple block diagram in schematic of an electronic circuit utilized in carrying out the calibration method for the tachometer of the invention.

Referring now to the drawing, the calibrator 21 is operable to convert a standard 60-cycle signal from source 20 to sharp pulses at a much higher multiple rate. The pulse repetition rate at the output will correspond to those repetition rates most commonly encountered in the operational environment of the tachometer 30.

Figure 2:
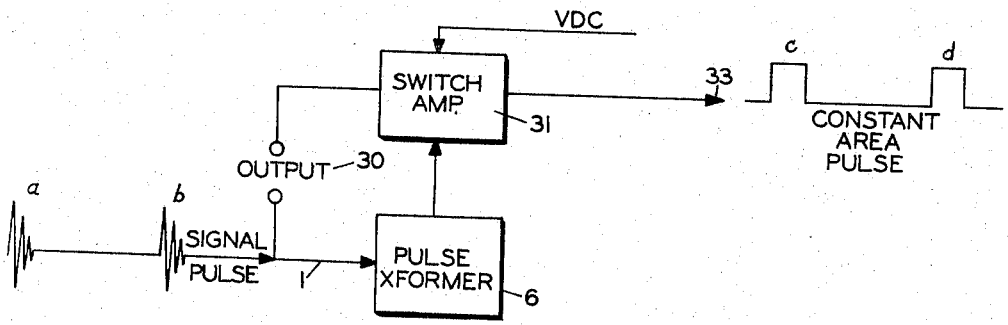
FIG. 2 is a block schematic diagram of the electronic circuitry of the tachometer of the present invention; and, FIG. 3 is schematic circuit diagram of the electronic circuitry of the block schematic shown in FIG. 2.

There is shown in FIG. 2, in block diagram form, the controlled switch pulse generator of the present invention. The pulses a and b represent engine ignition pulses or other occurring events to be counted. The ignition pulses are fed through the pulse transformer 6 to the switch amplifier 31. The amplifier 31 is normally in the "off" state at all times. Upon the occurrence of the signal pulse b a momentary signal is applied across the pulse transformer 6, the signal having a magnitude only sufficient to actuate the switch amplifier 31. To sustain the output signal of the switch amplifier 31, its output is fed back into the pulse transformer whose output is in turn again fed to the switch amplifier completing the closed loop feedback system. The output voltage across terminals 30 is a rectangular pulse having a height that is related to the D.C. voltage and a width that is a function of the inductance/resistance of the transformer 6.

It is apparent that since the width of the pulse is a function of the inductance/resistance of the transformer 6 and not related to the ignition pulse or dwell time, the output pulse at 30 will have a constant area irrespective of the frequency of the triggering pulses.

Figure 3:
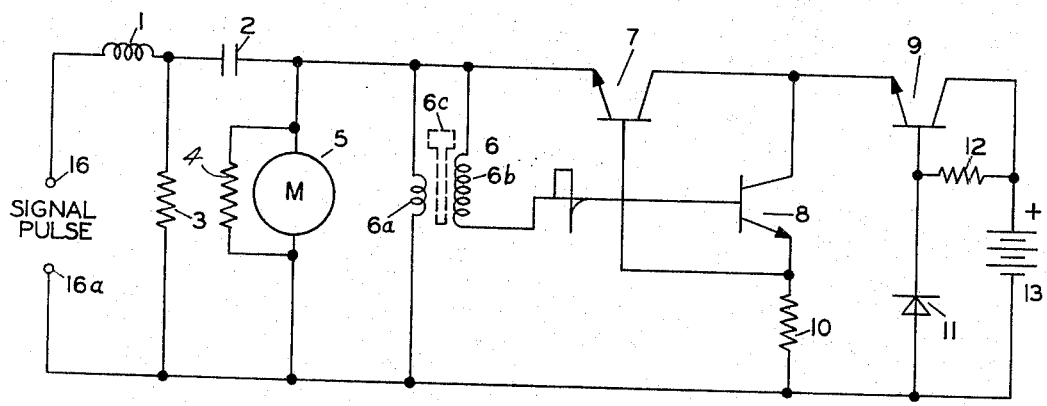

The schematic circuit of FIG. 3 illustrates in detail the components and operation of the tachometer shown in block in FIG. 2. In operation of the circuit of FIG. 2 as a tachometer for measuring the r.p.m. of an engine ignition system, the engine throb detected by a coil surrounding the ignition cable or other conventional means is applied to the input shown as 16 and 16a. The T network, comprising inductance 1, capacitance 2, and the resistance 3, forms a filter for the incoming signal to provide a definable trigger pulse. The primary feature of this filter is its ability to eliminate the ignition coil secondary pulse. Other known or conventional filter networks may be substituted for that shown.

The input signal passed by the filter network is applied across the primary 6a of the transformer 6. This voltage in turn induces a secondary pulse in the secondary winding 6b of the transformer 6. The induced pulse connected to the base of transistor 8 causes this transistor circuit to draw current. The output pulse at the junction of the emitter of transistor 8 and the resistance 10 is applied to the base of transistor 7 to actuate this transistor circuit. The output at the emitter of transistor 7 being connected to the windings of the transformer 6 again causes current to flow through the primary winding 6a in a closed feedback loop manner. In this way the secondary pulse from the winding 6b continues to supply current to the base of transistor 8, and hence maintain this circuit in a conducting state. This buildup continues until the magnetic field attains the maximum magnetizing current allowed by the transistor circuit 7. When this occurs the current change in the primary winding 6a will drop to zero and consequently the voltage across the secondary winding will drop to zero. With no further current applied, the transistor circuits 7 and 8 will revert to their off position.

The duration of the "on" time of the transistor circuits 7 and 8 is directly related to the inductance/resistance time constant of the transformer 6. The height of output pulses is controlled by the basic voltage regulator circuit comprising transistor 9, diode 11, and resistance 12 connected across the D.C. voltage source 13.

The meter 5 having shunt 4 and connected across the primary 6a will respond to the average current of the output pulses appearing across the primary 6a. The meter 5 may be calibrated to read out r.p.m. directly.

As stated above, one of the primary features of the tachometer of the present invention is its ability to respond to a calibrating standard signal—such as that disclosed in our co-pending application. In this particular embodiment, the standard pulses generated from the 60-cycle source would be applied directly to the input 16 and 16a. If for some reason the meter 5 does not indicate an r.p.m. to correspond to the number of pulses applied thereto, the regenerative switch amplifier is adjusted until the meter reads correctly. Adjustment of the amplifier is accomplished by varying the tunable core 6c in the transformer 6. In this way the inductance/resistance time constant is varied and consequently the pulse width is varied. Once the pulse width of the output pulses across the primary 6a is changed, the average current across the meter will correspondingly change. This simple adjustment permits correction in the simplest manner. It may also be pointed out that the response of the meter 5 to read out the correct r.p.m. is substantially instantaneous, the only lag (hardly discernable to the eye) is the inertial lag of the meter itself.

Since the output reading relating to r.p.m. is directly related to the constant area pulse output, the tachometer is equally accurate at low frequencies (300 r.p.m.) as well as the high frequencies (30,000 r.p.m.). And since the pulse is constant through the speed range there results in an indication having exceptional linearity but even of more importance this linearity is coupled with terminal accuracy.

A tachometer incorporating the principles of the present invention was constructed and proved to have the above noted response, accuracy and linearity. This tachometer was tested by an independent testing laboratory—the Ohio State University—against a Chronotachometer built by Standard Electric Time Company. The tachometer of the present invention was connected to the ignition system of a Ford V–8 engine mounted on a 200 H.P. General Electric dynamometer. The test procedure was as follows:

TEST A.—ELECTRONIC TACHOMETER AS RECEIVED (NO CHECK OF CALIBRATION)

| Electronic tach | Chronotach | Difference |
| --- | --- | --- |
| r.p.m. | r.p.m. | r.p.m. |
| 1,913 | 1,955 | 42 |
| 2,987 | 3,110 | 123 |

TEST B.—ELECTRONIC TACHOMETER CALIBRATED ON 110 V., 60 CYCLE CURRENT

| Electronic tach | Chronotach | Difference |
|---|---|---|
| 410 | 395 | −15 |
| 700 | 675 | −25 |
| 830 | 815 | −15 |
| 970 | 985 | 15 |
| 1,100 | 1,090 | −10 |
| 2,084 | 2,120 | 36 |
| 3,010 | 3,085 | 75 |

TEST C.—ELECTRONIC TACHOMETER CALIBRATED TO CHRONOTACHOMETER AT 1,850 R.P.M.

| Electronic tach | Chronotach | Difference |
|---|---|---|
| 350 | 310 | −40 |
| 390 | 380 | −10 |
| 580 | 575 | −5 |
| 675 | 675 | 0 |
| 830 | 810 | −20 |
| 975 | 980 | 5 |
| 1,850 | 1,850 | 0 |
| 2,410 | 2,475 | 65 |
| 3,020 | 3,050 | 30 |

The conclusion of the testing laboratory is as follows:

Tachometer performance

The indicating hand was very steady at all speeds. The scale covering 5000 r.p.m. does not permit readings much closer than or −25 r.p.m. The differences in the tests are mostly within the range of possible error in reading.

The maximum error after calibration was 1½% of maximum scale reading.

Tachometer calibrator

The electronic tachometer was calibrated first with the Ongaro Calibrator test (B), and then with the Chronotachometer, test (C). The calibrator used 60-cycle, 110-volt A.C. power.

The results of these two tests show that this electronic tachometer with a range of 0 to 5000 r.p.m. can be calibrated with approximately the same accuracy with either this calibrator or a standard speed source.

The accuracy of the calibrator appears to be much better than the reading accuracy of the Tachometer scale.

The calibrator is easy to use, and provides a very simple, accurate, and quick method of calibration of this electronic tachometer.

Although certain and specific embodiments have been shown or described, it is to be understood that modifications may be made thereto without departing from the spirit and scope of the invention.

What is claimed is:

1. A frequency measuring instrument for measuring the speed of an internal combustion engine including means for deriving a series of ignition pulses having a frequency directly related to said speed comprising, a regenerative amplifier including a transformer having primary and secondary windings, a current flow circuit in a closed loop arrangement with said primary winding, and bias means for preventing current flow through said circuit; means for applying said ignition pulses across said primary winding to cause current to regeneratively flow through said closed loop for a given period of time once for each of said ignition pulses, the output of said generator comprising a train of constant area pulses, indicating means connected in parallel with said primary winding for indicating the average current of said train of pulses, means for correlating said average current with said speed of said engine, means for varying the inductance/resistance time constant of said transformer to correct the speed indicating of said indicating means.

2. An instrument as set forth in claim 1 wherein said means for applying said ignition pulses across said primary further includes filter means.

3. An instrument as set forth in claim 1 further comprising, a standard pulse generator having a known pulse repetition rate, means for substituting said standard pulse for said ignition pulses, and means for correcting said average current reading to correspond to the average current reading of said standard pulses.

4. An instrument as set forth in claim 2 wherein said means for correcting said average current further comprises means for varying the width of said constant area pulses including a variable core means for said transformer for varying the inductance/resistance time constant of said core means.

5. An instrument as set forth in claim 2 wherein said means for correcting said average current further comprises means for varying the height of said constant area pulses.

References Cited by the Examiner

UNITED STATES PATENTS

| | | | |
|---|---|---|---|
| 2,857,518 | 10/1958 | Reed | 331—146 |
| 2,919,401 | 12/1959 | Cole et al. | 324—78 |
| 2,927,967 | 3/1960 | Edson | 330—26 |
| 2,933,692 | 4/1960 | Meyers | 330—30 |
| 2,995,706 | 8/1961 | Clarridge | 324—78 |
| 3,107,330 | 10/1963 | Hausen | 324—81 |
| 3,175,152 | 3/1965 | Shafer | 324—70 |

FOREIGN PATENTS 885,617  12/1961  Great Britain.

OTHER REFERENCES

"Auto Tachometer Uses Transistor" (Cowan), Electronics, Aug. 15, 1958, pp. 92 and 94.

WALTER L. CARLSON, *Primary Examiner.*

FREDERICK M. STRADER, RUDOLPH V. ROLINEC, *Examiners.*

M. J. LYNCH, C. W. HOFFMAN, *Assistant Examiners.*